(12) United States Patent
Xia et al.

(10) Patent No.: US 7,315,674 B2
(45) Date of Patent: Jan. 1, 2008

(54) OPTICAL FILTER

(75) Inventors: Tiejun J. Xia, Richardson, TX (US);
David Z. Chen, Richardson, TX (US)

(73) Assignee: Verizon Business Global LLC,
Basking Ridge, NJ (US)

( * ) Notice: Subject to any disclaimer, the term of this patent is extended or adjusted under 35 U.S.C. 154(b) by 0 days.

(21) Appl. No.: 11/460,165

(22) Filed: Jul. 26, 2006

(65) Prior Publication Data

US 2006/0280402 A1 Dec. 14, 2006

Related U.S. Application Data

(62) Division of application No. 11/147,214, filed on Jun. 8, 2005, now Pat. No. 7,248,758.

(51) Int. Cl.
*G02B 6/28* (2006.01)
(52) U.S. Cl. .................................................. 385/24
(58) Field of Classification Search ............... 385/27, 385/15, 24, 124, 14, 21
See application file for complete search history.

(56) References Cited

U.S. PATENT DOCUMENTS

| | | | |
|---|---|---|---|
| 6,219,474 B1 | 4/2001 | Cai | 385/24 |
| 6,292,299 B1 | 9/2001 | Liou | |
| 6,320,996 B1 | 11/2001 | Scobey | 385/18 |
| 6,594,059 B2 | 7/2003 | Flanders | |
| 6,718,086 B1 * | 4/2004 | Ford et al. | 385/27 |
| 6,980,713 B2 | 12/2005 | Hwang | 385/24 |
| 2003/0063842 A1 | 4/2003 | Cormack et al. | |
| 2004/0247239 A1 * | 12/2004 | Eldada | 385/27 |

* cited by examiner

*Primary Examiner*—Quyen P Leung

(57) ABSTRACT

A method for implementing a truly hitless tunable filter for use in adding and/or dropping channels in a wavelength division multiplexed (WDM) network is disclosed. An exemplary method for filtering an optical signal may include providing a composite optical signal having several wavelengths including a first wavelength, a second wavelength and other wavelengths. The method may include passing the first wavelength through a filter and reflecting the second wavelength and the other wavelengths with the filter. The method may include making the first wavelength available to a drop port, and making the second wavelength and the other wavelengths available to an output port.

26 Claims, 11 Drawing Sheets

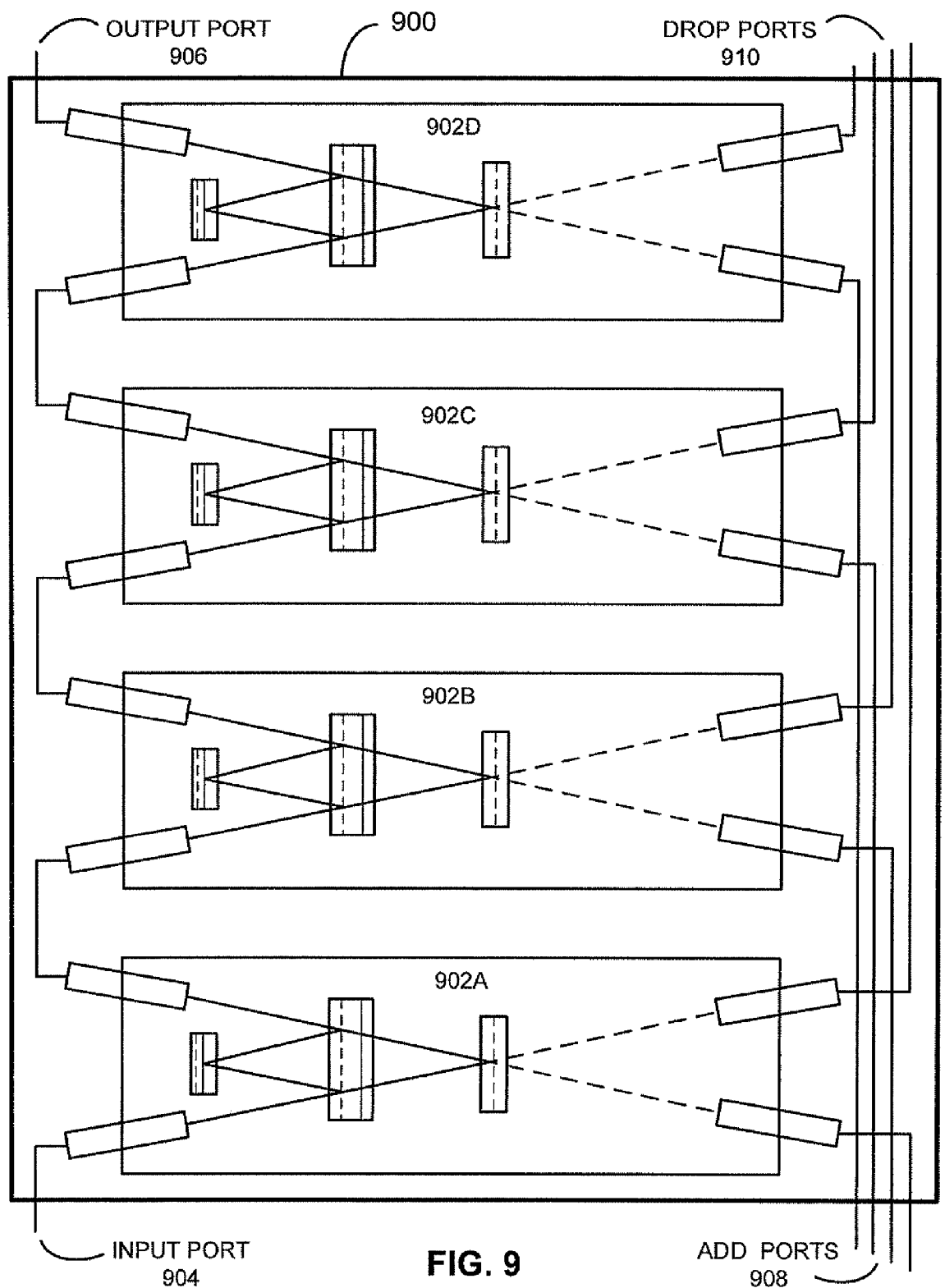

OPTICAL FILTER

This application is a divisional application of U.S. patent application Ser. No. 11/147,214 filed on Jun. 8, 2005 now U.S. Pat. No. 7,248,758, which is hereby incorporated by reference.

FIELD OF THE INVENTION

Implementations consistent with the principles of the invention relate generally to filters used in optical networks, and more particularly, to hitless tunable filters configured for use in an optical communication network.

BACKGROUND OF THE INVENTION

Modern communication networks may carry data using optical signals transported across optical fibers. One technique for carrying communication data on an optical fiber is wavelength division multiplexing (WDM). WDM is a technique that allows multiple optical signals to be carried on a single optical fiber. In WDM, optical signals may be separated according to wavelength, where each wavelength may carry a channel of data. For example, WDM may encode ten channels of data onto a single optical fiber by encoding each data channel onto one of ten different wavelengths.

WDM signals may be dropped from a fiber and/or added to a fiber using devices such as re-configurable optical add/drop multiplexers (ROADMs). A ROADM is a device that allows one-or-more wavelengths to be removed from, added to, or remain untouched on a WDM fiber. As a result, a ROADM may be used to "drop" an optical signal from the fiber, such as might occur when an optical signal is made available to a user device. A ROADM may also be used to "add" a signal to a WDM fiber, such as might occur when an optical signal is placed onto a WDM fiber by a user device. An untouched optical signal may pass through a ROADM without being manipulated by the ROADM.

ROADMs may employ optical tuners to drop and/or add optical signals to a WDM fiber. Optical tuners may operate by allowing an optical signal with a particular wavelength to pass through the tuner while reflecting other wavelengths in the WDM data stream. Optical tuners may disturb wavelengths other than the particular wavelength being added and/or dropped When other wavelengths are impacted, the wavelengths are referred to as being "hit". Minimizing and/or eliminating hits may help WDM networks operate more reliably.

SUMMARY OF THE INVENTION

In accordance with an implementation, a method for filtering an optical signal is provided. The method may include providing a composite optical signal having several wavelengths including a first wavelength, a second wavelength and other wavelengths. The method may include passing the first wavelength through a filter and reflecting the second wavelength and the other wavelengths with the filter. The method may include making the first wavelength available to a drop port, and making the second wavelength and the other wavelengths available to an output port.

In accordance with another implementation, a device for filtering an optical signal is provided. The device may include a tunable filter having a first arrangement and configured to receive a composite optical signal having a first optical wavelength and a second optical wavelength. The tunable filter may be configured to pass the first optical wavelength and reflect the second optical wavelength. The device may include a fixed mirror configured to receive the second optical wavelength and reflect the second optical wavelength back to the tunable filter so that the tunable filter can reflect the second optical wavelength to an output port. The device may include a moveable mirror configured to reflect the first optical wavelength to the tunable filter when in a first position. The moveable mirror may be configured to pass the first optical wavelength when in a second position.

In accordance with yet another implementation, a tunable filter is provided. The tunable filter may include an input port to make a composite optical signal available, where the composite optical signal has a first wavelength, a second wavelength and a third wavelength. The tunable filter may include an output port, a moveable mirror, and a tunable filter element positioned in a first orientation, where the first orientation is configured to pass the first wavelength to the moveable mirror when the moveable mirror is in a first position, and reflect the second wavelength and the third wavelength. The tunable filter may include a fixed mirror configured to receive optical wavelengths reflected from the tunable filter element, and reflect the received optical wavelengths back to the tunable filter element via a reflecting surface so that the tunable filter element can reflect the reflected optical wavelengths to the output port In accordance with still another implementation, a hitless tunable filter is provided. The hitless tunable filter may include means for making a composite optical signal available to a filtering means via an input port, means for passing a first wavelength through the filtering means and for reflecting at least a second wavelength, means for reflecting the at least second wavelength to an output port in conjunction with the filtering means, and means for reflecting the first wavelength to the output port where a path traversed by the first wavelength and a path traversed by the at least second wavelength between the input port and the output port have the same length.

In accordance with yet another implementation, a method for providing a first wavelength to a destination using a truly hitless tunable filter is provided. The method may include providing a composite input signal having the first wavelength and at least one other wavelength to the truly hitless tunable filter and tuning the truly hitless tunable filter to provide the first wavelength to the destination without hitting the at least one other wavelength.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 9 illustrates an exemplary device that employs four hitless tunable filters operating in a cascade arrangement consistent with the principles of the invention.

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations may include a truly hitless tunable filter operating alone or in combination with other devices, such as additional truly hitless tunable filters. For example, implementations of truly hitless tunable filters may be cascaded together and deployed within a device such as a ROADM. Implementations may perform optical switching of a desired wavelength without hitting other wavelengths that may be present on a WDM fiber. In addition, implementations may provide truly hitless tunable filters having low insertion losses that may be due, at least in part, to relatively simple optical paths used within the implementations.

Exemplary System

Figure 1:
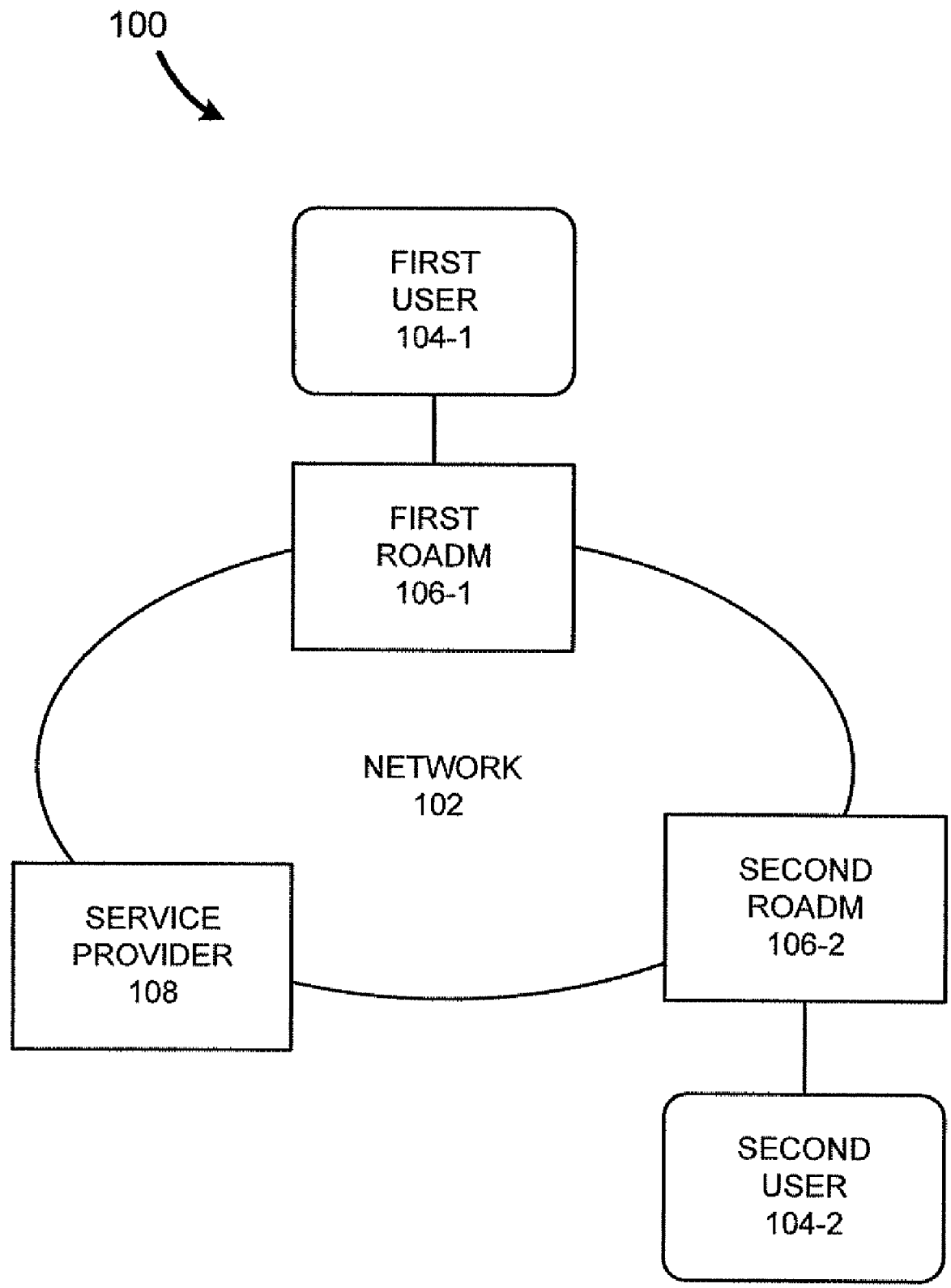
FIG. 1 illustrates an exemplary system that can be configured to operate in accordance with the principles of the invention.

FIG. 1 illustrates an exemplary system that can be configured to operate in accordance with the principles of the invention. System 100 may include a network 102, a first user 104-1, a second user 104-2, a first ROADM 106-1, a second ROADM 106-2, and a service provider 108.

Network 102 may include any network capable of carrying optical data using one or more optical fibers. In one implementation, network 102 may be a wave division multiplexed (WDM) network, such as a dense WDM (DWDM) or a coarse WDM (CWDM). Network 102 may be a local area network (LAN), such as a network associated with a university campus, a metropolitan area network (MAN), such as a city wide network, and/or a wide area network (WAN), such as an Internet network. Network 102 may support substantially any networking protocol, such as asynchronous transfer mode (ATM), Internet protocol (IP), synchronous optical transport (SONET), and/or transmission control protocol (TCP). Network 102 may carry multiple optical wavelengths on a single fiber, where each wavelength may be associated with a data channel carried via the fiber(s). For example, a first channel may be used by first user 104-1 and encoded via a first wavelength and a second channel may be used by second user 104-2 and encoded via a second wavelength.

First user 104-1 and/or second user 104-2 (also referred to as user 104) may include any device and/or system configured to accept data from and/or place data on network 102. For example, user 104 may include a LAN associated with a corporation. The LAN may include one or more devices, such as servers, routers, switches, firewalls, and/or network address translators (NATs). User 104 may interact with network 102 via one-or-more optical channels configured to carry data to/from network 102.

First ROADM 106-1 and/or second ROADM 106-2 (also referred to as ROADM 106) may include any device capable of dropping a DWDM channel, adding a DWDM channel and/or passing a DWDM channel from an input port to an output port. For example, ROADM 106-1 may be configured to add a DWDM channel to network 102, such as might occur if first user 104-1 attempts to place data on network 102. ROADM 106-1 may also be configured to drop a channel from network 102, such as might occur if first user 104-1 receives data from network 102. ROADM 106-1 may also be configured to pass data without adding or dropping a channel, such as might occur if data is sent from service provider 108 to ROADM 106-2 in a clockwise direction passing through ROADM 106-1.

Service provider 108 may include any device configured to operate with network 102. For example, service provider 108 may be configured to place data onto network 102, remove data from network 102, and/or control devices and/or data associated with network 102, such as ROADM 106-1 and/or ROADM 106-2. Service provider 108 may operate in conjunction with a dedicated ROADM 106 and/or may be configured to operate directly with network 102 by incorporating ROADM-like functionality within devices and/or systems associated with service provider 108.

Implementations of system 100 may support substantially any number of DWDM channels using one-or-more optical fibers. System 100 may also support substantially any number of users, devices, and/or service providers without departing from the spirit of the invention.

Exemplary Filter Implementation

Figure 2:
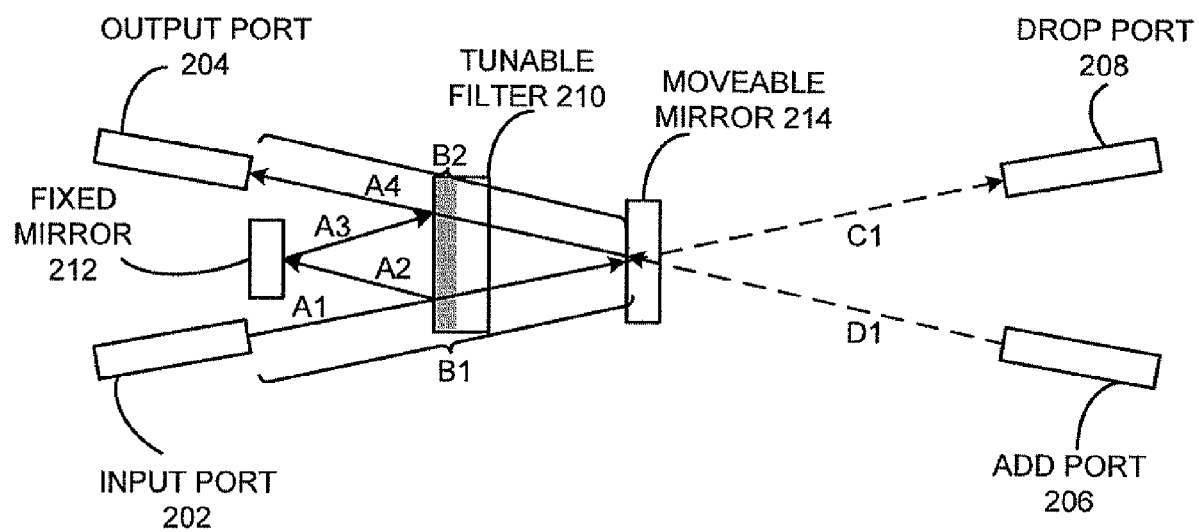
FIG. 2 illustrates an exemplary implementation of a hitless tunable filter that may be configured to maintain substantially equivalent optical path lengths between optical signals reflected from a tunable filter and between an optical signal passing through the tunable filter consistent with the principles of the invention.

FIG. 2 illustrates an exemplary implementation of a hitless tunable filter that may be configured to maintain substantially equivalent optical path lengths between optical signals reflected from a tunable filter and between an optical signal passing through the tunable filter consistent with the principles of the invention. In one implementation, the hitless tunable filter is included with a ROADM 106. In another implementation, the hitless tunable filter may be separate from ROADM 106, such as within service provider 108.

The implementation of FIG. 2 may depict a general representation and arrangement of components that can be used for implementing aspects of the invention. The implementation of FIG. 2 may employ components having configurations such as curved mirrors, flat mirrors, microelectromechanical switch (MEMS) mirrors, thin film tunable filters, thermally tuned filters, MEMS tunable filters, and/or other components for manipulating optical signals. Implementations employing certain of these components in selected configurations may be described in conjunction with subsequent figures.

As shown in FIG. 2, the hitless tunable filter may include an input port 202, an output port 204, an add port 206, a drop port 208, a tunable filter 210, a fixed mirror 212, and a moveable mirror 214. Input port 202 may include any device configured to make a composite optical signal available to tunable filter 210 and/or moveable mirror 214. For example, a composite input signal may include a group of optical wavelengths. Input port 202 may include a collimating lens for focusing incoming wavelengths on a determined location associated with a surface of tunable filter 210. Output port 204 may include any device configured to receive one or more optical wavelengths from tunable filter 210 and/or to make the one or more optical wavelengths available to another fiber and/or device.

Add port 206 may include any device configured to make one or more optical wavelengths available to moveable mirror 214, tunable filter 210 and/or output port 204. In one implementation, add port 206 may be configured in a manner substantially similar to input port 202. Drop port 208 may include any device configured to make one or more optical wavelengths available to another optical fiber and/or device. In one implementation, drop port 208 may be configured in a manner substantially similar to output port 204.

Tunable filter 210 may include any device capable of receiving one or more optical wavelengths at a first surface and reflecting one or more optical wavelengths to another device, such as fixed mirror 212, and/or passing one or more optical wavelengths from a first surface to a second surface en route to another device, such as moveable mirror 214 and/or drop port 208. Implementations of tunable filter 210 may pass and/or reflect particular optical wavelengths as a function of the incident angle of the wavelengths, as a function of the temperature of tunable filter 210, and/or as a function of the position of tunable filter 210. Implementations of tunable filter 210 may be configured to receive optical signals via free space.

Fixed mirror 212 may include any device configured to reflect optical signals to a destination. Fixed mirror 212 may be configured to reflect optical signals back to a location from which the optical signals were received and/or to reflect optical signals to another location. Fixed mirror 212 may operate alone or in conjunction with other devices, such as lenses, prisms, and/or other optical and/or electro-optical elements.

Moveable mirror 214 may include any device configured to reflect optical signals to another device and/or location, such as tunable filter 210 and/or output port 204, via a reflecting surface. Implementations may include a moveable mirror 214 configured to pass optical signals received at a first surface to another device and/or location via a second surface. Moveable mirror 214 may have two primary positions, such as a tuning position and/or a working position.

In a tuning position, moveable mirror 214 may be positioned as shown in FIG. 2 so that optical signals incident on moveable mirror 214 may be reflected to a destination, such as output port 204. In a working position, moveable mirror 214 may be positioned so that one or more wavelengths pass through tunable filter 210 and reach drop port 208 via a path, such as C1, without contacting moveable mirror 214. When moveable mirror 214 is in a working position, optical signals from add port 206 may reach output port 204 since moveable mirror 214 may not be located in the optical path between add port 206 and output port 204.

The implementation of FIG. 2 may operate as a truly hitless tunable filter with a composite optical signal containing, for example, wavelengths of λ1, λ2, λ3, λ4, and λ5. The implementation of FIG. 2 may operate by switching between one wavelength, such as λ1, and another wavelength, such as λ4, without hitting any intervening wavelengths, such as λ2 and/or λ3. λ2 and λ3 are hit if they are disturbed when switching from, for example, λ1 to λ4. Implementations may operate without hitting wavelengths other than the wavelengths being switched.

By way of example, assume that the composite optical signal is made available to tunable filter 210 via input port 202. The composite signal may traverse path A1 between input port 202 and tunable filter 210. Wavelengths λ2-λ5 may be reflected from tunable filter 210 to fixed mirror 212 via path A2 and from fixed mirror 212 back to tunable filter 210 via path A3. Tunable filter 210 may be configured to reflect wavelengths λ2-λ5 to output port 204 via path A4. Tunable filter 210 may be positioned so that λ1 passes from a first surface of tunable filter 210 to a second surface of tunable filter 210 while wavelengths λ2-λ5 are reflected via the first surface of tunable filter 210. Path B1 may be traversed by λ1 en route to a reflecting surface of moveable mirror 214. The implementation of FIG. 2 may be configured and arranged such that path B1 is one-half the length of path A1+A2+A3+A4.

In a working mode, moveable mirror 214 may be positioned so as not to be in a path taken by λ1 and/or other wavelengths passing through tunable filter 210, so that λ1 may be made available to drop port 208. Alternatively, a wavelength, such as λ6, may be made available to output port 204 via add port 206 when moveable mirror 214 is positioned in accordance with a working mode. A wavelength, such as λ6, may traverse path D1+B2 en route to output port 204. The implementation of FIG. 2 may be configured such that path D1 is the same length as path C1 and/or B1.

A tuning mode may be employed to switch from one dropped wavelength, such as λ1, to another wavelength, such as λ4. In a tuning mode, moveable mirror 214 may be configured to reflect λ1 to output port 204 via path B2. As a result, wavelengths λ1-λ5 may be present at output port 204 in the tuning mode. If path B2 is configured to be the same length as path B1, $$B1+B2=A1+A2+A3+A4 \quad \text{(Eq. 1)}.$$

Equation 1 indicates that the tuning mode optical path length from input port 202 to output port 204 may be the same for optical signals reflected from tunable filter 210 (e.g., wavelengths λ2-λ5) as it is for signals passing through tunable filter 210 and being reflected from moveable mirror 214 (e.g., λ1). When the A1-A4 and B1-B2 optical path lengths are the same, signals at output port 204 may appear to have traveled the same distance regardless of the particular A or B path traversed. Downstream devices on network 102 may not detect any relative differences that are attributable to path length delays between λ1 and wavelengths λ2-λ5.

Tunable filter 210 may be positioned, or repositioned, to allow other wavelengths to reach moveable mirror 214. For example, tunable filter 210 may be repositioned with respect to wavelengths λ1-λ5 so as to allow only λ4 to reach moveable mirror 214. Moveable mirror 214 may be placed in a working mode position so that λ4 is made available to drop port 208.

The implementation of FIG. 2 may allow determined wavelengths to selectively pass through tunable filter 210 without hitting other wavelengths. For example, λ2 and λ3 may not be disturbed during the tuning operation when tunable filter 210 is tuned from λ1 to λ4. As such, the implementation of FIG. 2, as well as other implementations described herein, may operate as truly hitless tunable filters. The implementation of FIG. 2 may be configured so that path lengths C1 and D1 are substantially the same length as paths B1 and B2.

Exemplary Hitless Filter Configuration

Figure 3A:
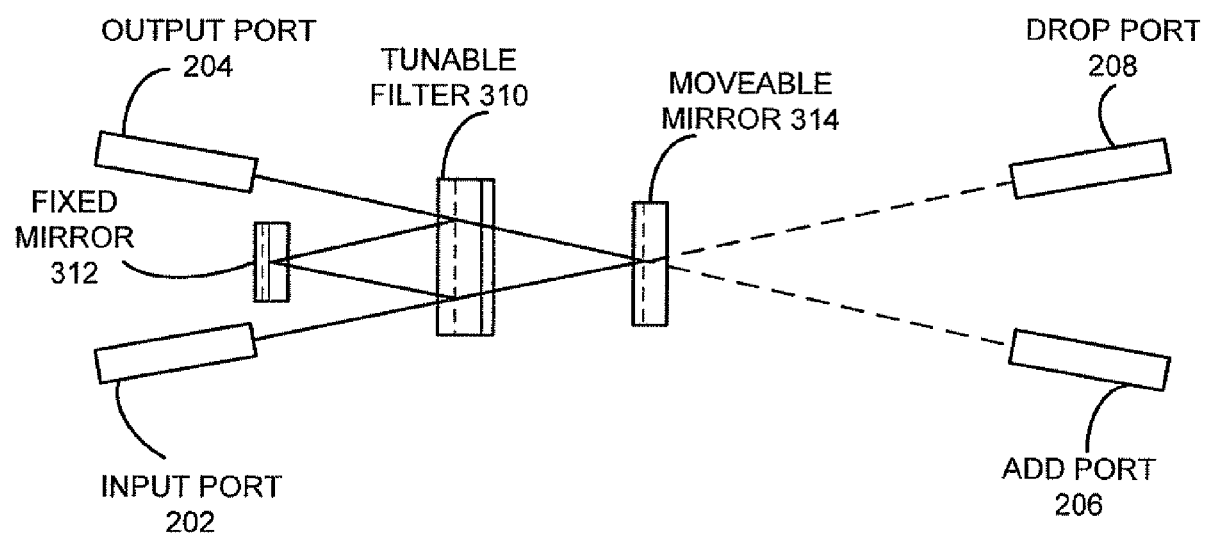
FIG. 3A illustrates a side view of an exemplary implementation of a tunable filter that can be configured to operate on optical signals consistent with the principles of the invention.

FIG. 3A illustrates a side view of an exemplary implementation of a tunable filter that can be configured to operate on optical signals consistent with the principles of the invention. The implementation of FIG. 3A may include input port 202, output port 204, add port 206, drop port 208, tunable filter 310, fixed mirror 312, and/or moveable mirror 314. Tunable filter 310 may be a thin film tunable filter that may pass one or more wavelengths as a function of the angle formed by incident optical signals on the first surface of tunable filter 310. A thin film implementation may be configured and adapted with a surface coating that allows tunable filter 310 to pass a single wavelength or more than one wavelength as a function of an incident angle. Tunable filter 310 may be selected according to a working range of wavelengths that will be used for a particular application, such as in a particular implementation of network 102.

Fixed mirror 312 may include a mirror employing a curved reflecting surface facing tunable filter 310. The curved surface may be adapted to reflect an incident optical signal back to a location on tunable filter 310 that may correspond to the location from which the incident optical signal originated on the first surface of tunable filter 310. In one implementation, fixed mirror 312 may be configured so that wavelengths associated with an incident beam strike a center of curvature associated with fixed mirror 312. Moveable mirror 314 may include a mirror having a substantially flat reflecting surface and/or a curved reflecting surface.

Figure 3B:
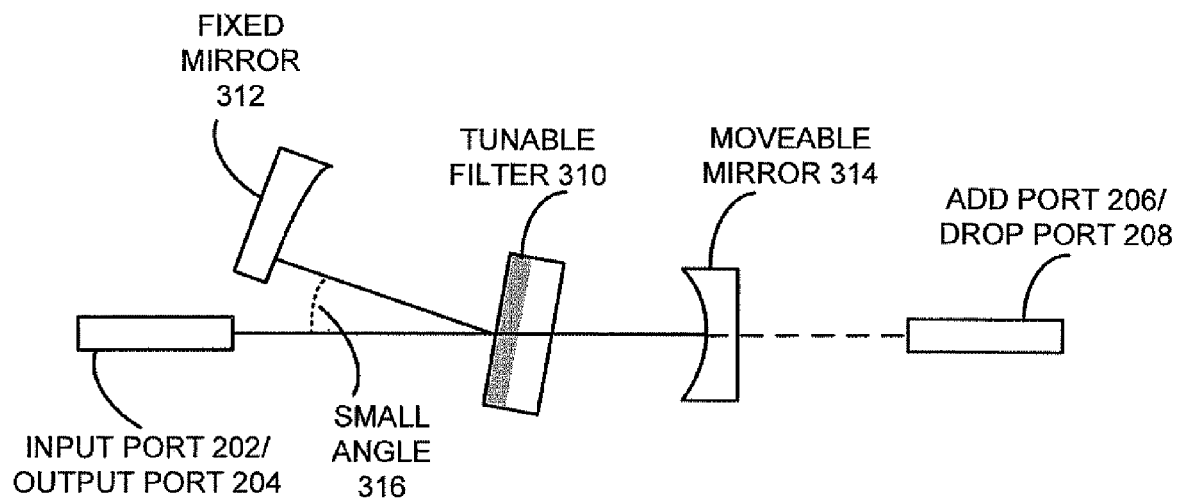
FIGS. 3B and 3C illustrate top views of the implementation of FIG. 3A for a small tuning angle orientation and for a large tuning angle orientation, respectively.
Figure 3C:
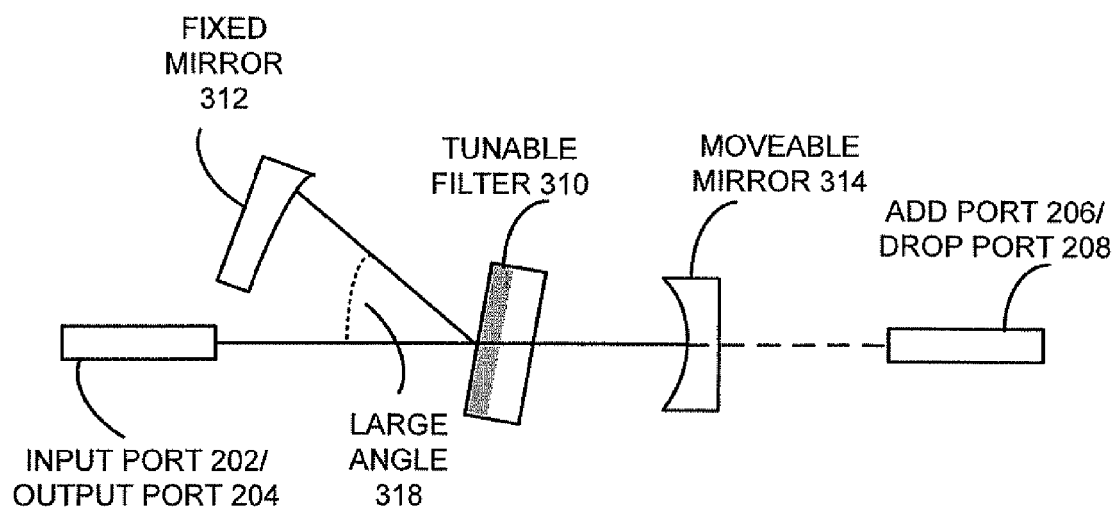

FIGS. 3B and 3C illustrate top views of the implementation of FIG. 3A for a small tuning angle orientation and for a large tuning angle orientation, respectively. In FIGS. 3B and 3C input port 202 may lie directly over output port 204 and add port 206 may lie directly over drop port 208 as viewed on a page. As a result, only two of the four ports may be visible in these figures. In other implementations, the four ports may be oriented differently.

Angle 316 (FIG. 3B) may represent a small tuning angle geometry. Angle 316 may be associated with a particular wavelength, such as $\lambda 1$ in the example discussed in conjunction with FIG. 2. In contrast, angle 318 (FIG. 3C) may be associated with a large tuning angle geometry. Angle 318 may be associated with, for example, $\lambda 4$ as discussed in conjunction with FIG. 2. Implementations may be adapted to operate over substantially any range of tuning angles depending on the wavelengths used, geometry of components used to filter particular wavelengths, coatings used on tunable filter 310, curvatures used on fixed mirror 312, and types of mirrors used for moveable mirror 314. Therefore, implementations are not limited to any particular range of working and/or tuning angles.

Exemplary Sequence of Operation

FIGS. 4A-4D illustrate an exemplary operating sequence for an exemplary implementation of a hitless tunable filter consistent with the principles of the invention. FIGS. 4A-4D may include input port 202, output port 204, add port 206, drop port 208, tunable filter 310, fixed mirror 312, and moveable mirror 314.

Figure 4A:
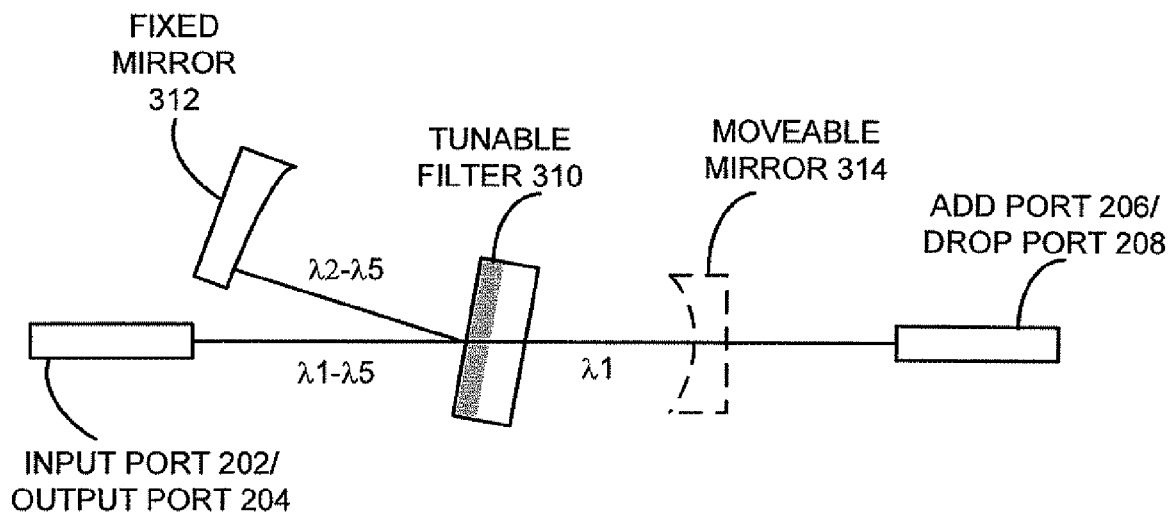
FIGS. 4A-4D illustrate an exemplary operating sequence for an exemplary implementation of a hitless tunable filter consistent with the principles of the invention.
Figure 4B:
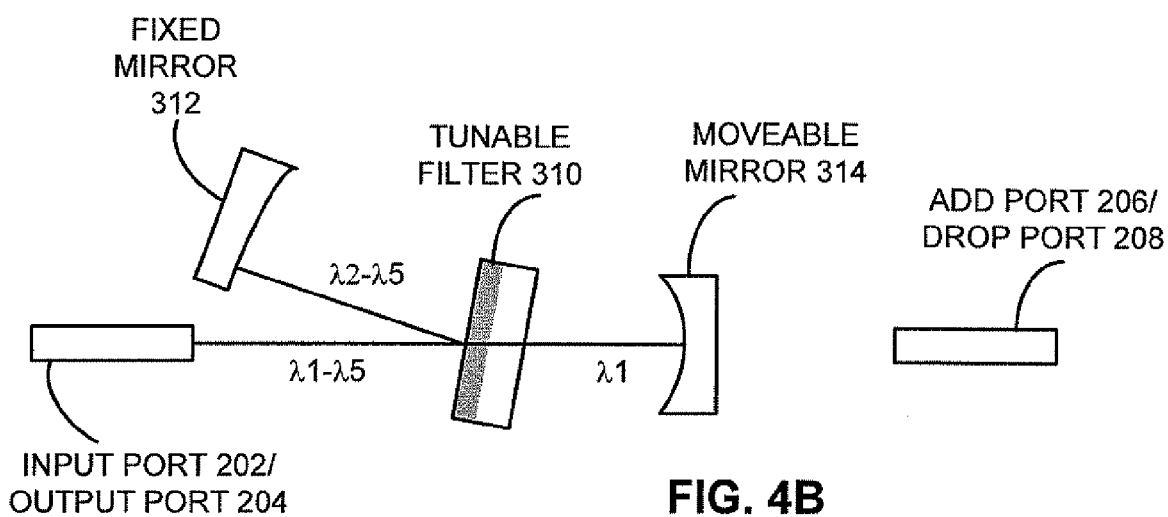

FIG. 4A illustrates a working mode for a first wavelength, such as $\lambda 1$. In the working mode, $\lambda 1$ may be made available to drop port 208 after passing through tunable filter 310. FIG. 4B illustrates a tuning mode for the first wavelength. In the tuning mode, the first wavelength may be reflected by moveable mirror 314 so that all wavelengths incident on tunable filter 310 may be made available to an output port, such as output port 204.

Figure 4C:
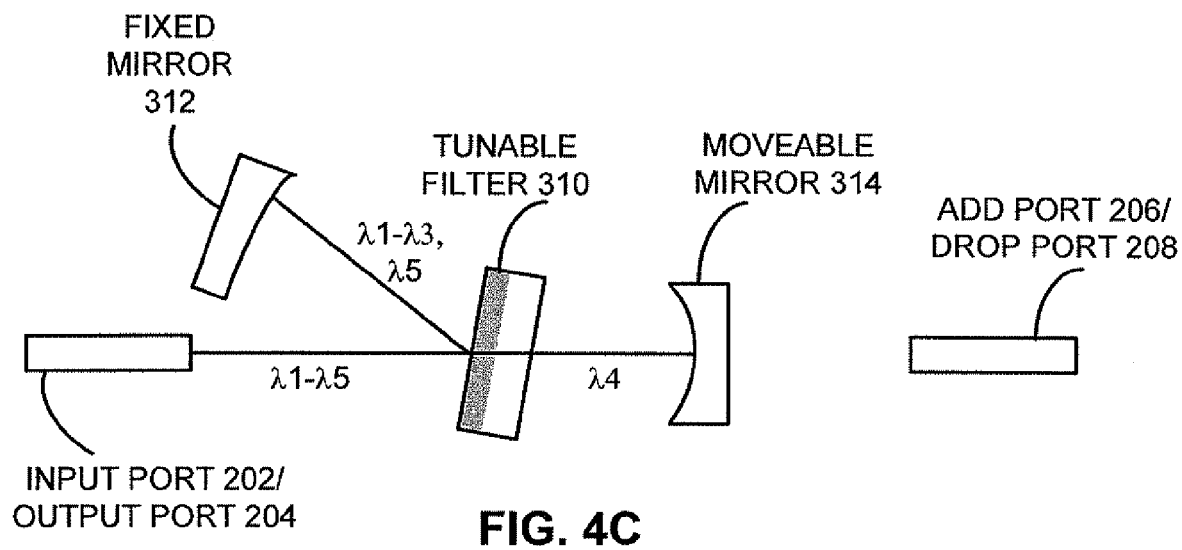
Figure 4D:
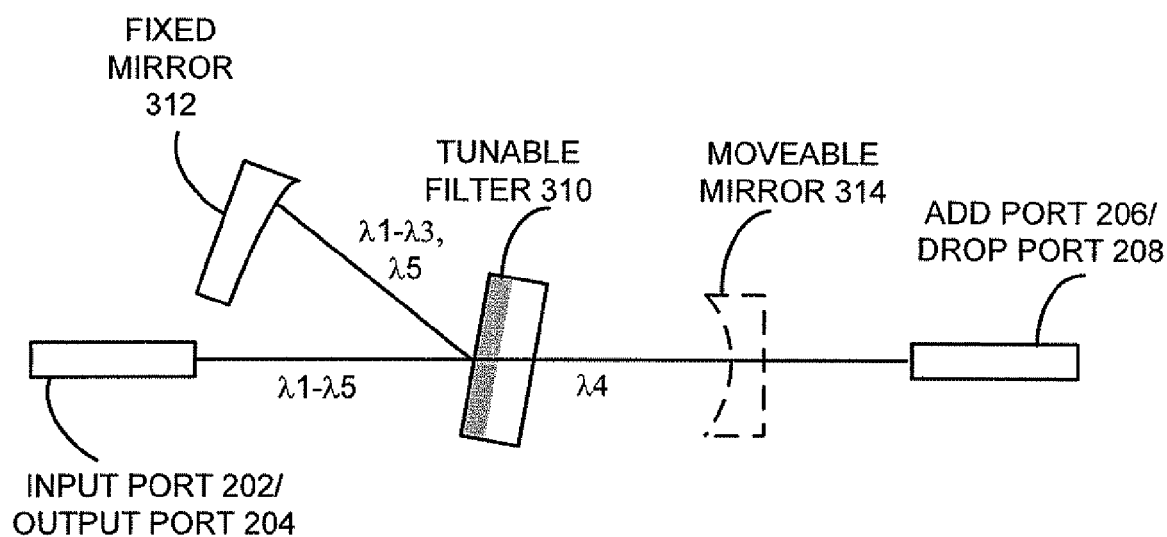

FIG. 4C illustrates the tuning mode of FIG. 4B where tunable filter 410 may be manipulated to another wavelength, such as $\lambda 4$. All wavelengths incident on tunable filter 310 may be made available to an output port 204 in the implementation of FIG. 4C. FIG. 4D illustrates a working mode where a new wavelength may be made available to drop port 208. The operational sequence of FIGS. 4A through 4D may tune from one wavelength to another wavelength without hitting wavelengths lying between the initial wavelength (FIG. 4A) and the later tuned wavelength (FIG. 4D). For example, in the implementation of FIGS. 4A-4D, $\lambda 2$, $\lambda 3$ and $\lambda 5$ may not be hit when switching from $\lambda 1$ to $\lambda 4$.

Exemplary Compensation Techniques

Figure 5A:
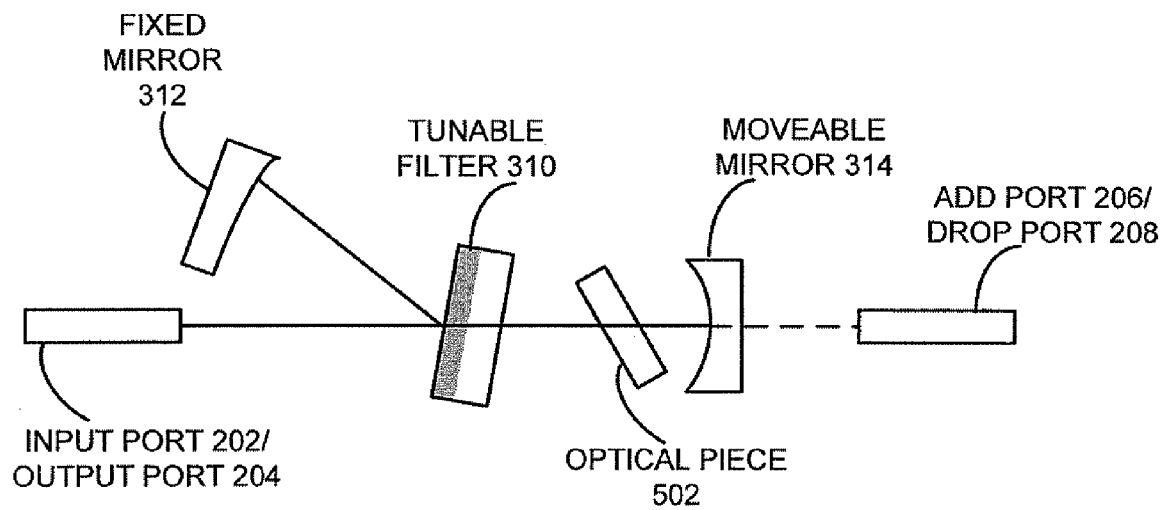
FIGS. 5A and 5B illustrate exemplary techniques for implementing optical compensation in implementations of hitless tunable filters consistent with the principles of the invention.
Figure 5B:
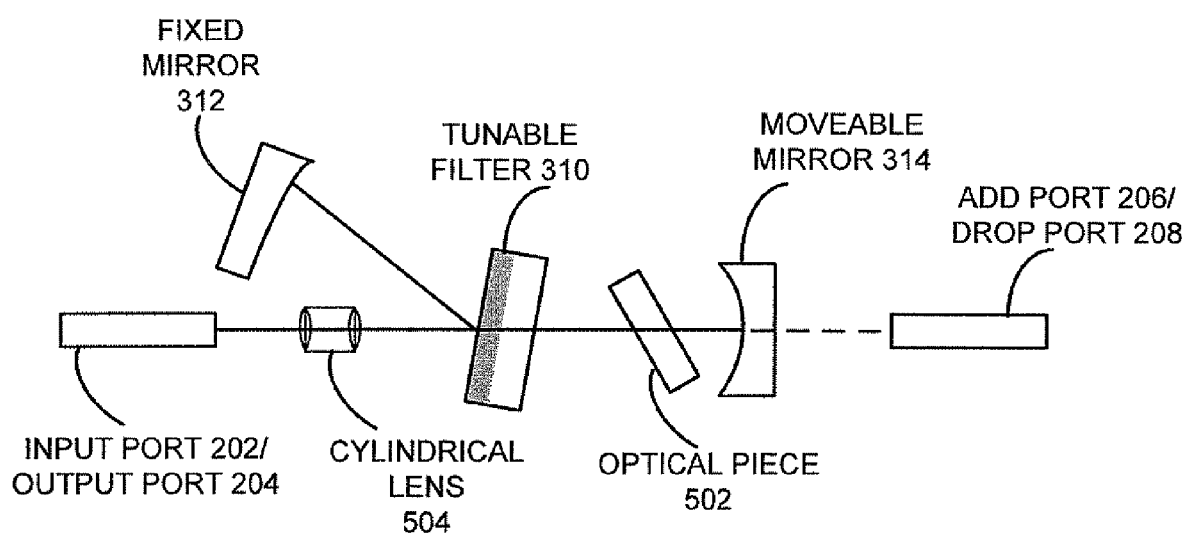

FIGS. 5A and 5B illustrate exemplary techniques for implementing optical compensation in implementations of hitless tunable filters consistent with the principles of the invention. Implementations may be adapted to compensate for focusing and/or path length aspects associated with components such as input port 202, tunable filter 310 and/or fixed mirror 312. For example, in FIG. 5A an optical piece 502 may be configured and adapted to compensate for focus and/or optical path length. Optical piece 502 may include any device configured to induce a variation in an optical path associated with an optical beam. Optical piece 502 may include an optical component, such as a prism, piece of glass, a lens and/or an opto-electrical component that may change optical characteristics as a function of an applied electrical potential and/or current.

FIG. 5B illustrates the implementation of FIG. 5A along with a cylindrical lens 504. Input port 202 may provide a focused composite beam via a collimating lens. The implementation of FIG. 5B may operate efficiently when reflections from fixed mirror 312 are focused on tunable filter 310 with a desired resolution. Receiving composite beams via focusing devices may cause the focusing contribution of fixed mirror 312 to exceed a desired resolution. The implementation of FIG. 5B may employ focusing and/or defocusing devices, such as cylindrical lens 504, to correct for focusing/defocusing contributions attributable to other components.

Cylindrical lens 504 may include any device configured to focus and/or defocus an optical beam. Cylindrical lens 504 may operate on a single wavelength or may operate on a composite beam. Cylindrical lens 504 may be configured to compensate one or more wavelengths in one direction, such as in a plane of curvature of fixed mirror 312. By correcting in a single direction, cylindrical lens 504 may ensure that an output beam including one or more wavelengths is substantially circular. Cylindrical lens 504 may operate with, or without, optical piece 502 when operating on one or more wavelengths interacting with tunable filter 310, fixed mirror 312 and/or moveable mirror 314.

Exemplary Monitor Port Implementation

Figure 6:
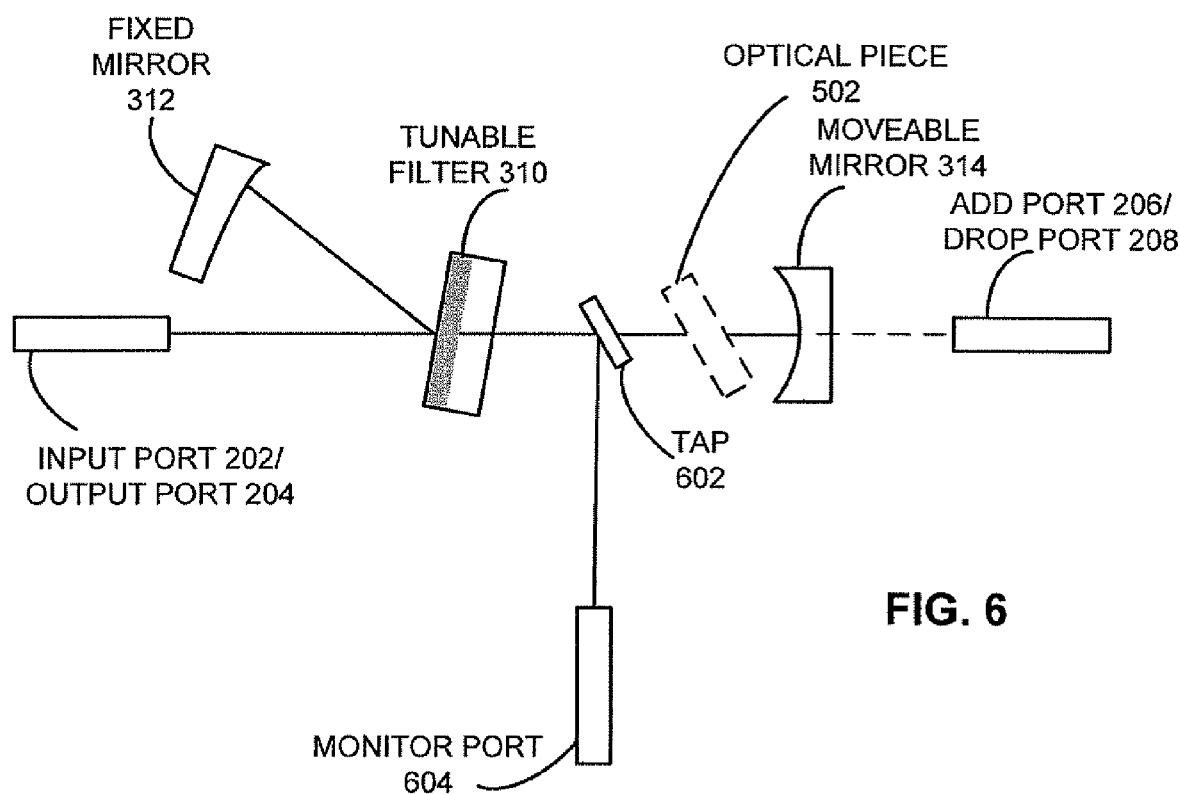
FIG. 6 illustrates a technique for implementing a monitor port in an exemplary implementation of a hitless tunable filter consistent with the principles of the invention.

FIG. 6 illustrates a technique for implementing a monitor port in an exemplary implementation of a hitless tunable filter consistent with the principles of the invention. The implementation of FIG. 6 may include input port 202, output port 204, add port 206, drop port 208, tunable filter 310, fixed mirror 312, moveable mirror 314, optical piece 502, tap 602 and monitor port 604. Tap 602 may include any device configured to make one or more wavelengths available to another device. Monitor port 604 may include any device configured to receive an optical and/or electrical signal associated with a monitored signal. For example, in one implementation, tap 602 may include a photo detector operatively coupled to a receiving device, such as an analog-to-digital converter. Other implementations may use a piece of glass and or other tapping devices for tap 602.

Exemplary Implementation for Increasing Extinction Ratio

Figure 7:
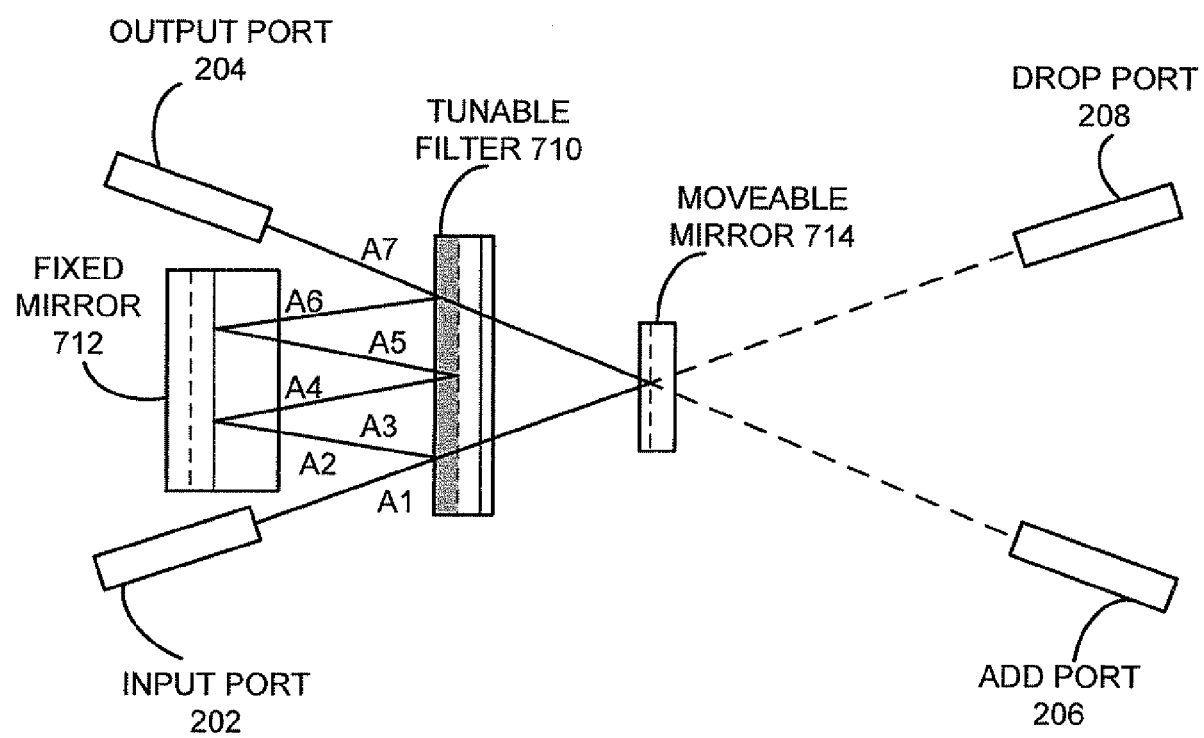
FIG. 7 illustrates an exemplary hitless tunable filter that may employ multiple reflections to increase the extinction ratio of an exemplary implementation consistent with the principles of the invention.

FIG. 7 illustrates an exemplary hitless tunable filter that may employ multiple reflections to increase the extinction ratio of an exemplary implementation consistent with the principles of the invention. Extinction ratio may refer to a ratio of the power associated with an optical representation of a binary "one" to the power associated with an optical representation of a binary "zero". Implementations may improve the extinction ratio by employing additional reflected paths between a tunable filter and a fixed mirror.

FIG. 7 illustrates one such implementation that may be used to improve an extinction ratio and may include input port 202, output port 204, add port 206, drop port 208, tunable filter 710, fixed mirror 712, and moveable mirror 714. Tunable filter 710 may be adapted for operation using multiple reflections and/or may operate in a manner similar to tunable mirror 310 and may be adapted to accommodate multiple reflections with fixed mirror 712. For example, the implementation of FIG. 7 may employ paths A1-A4 as illustrated in FIG. 2 along with additional reflected paths A5-A7. The additional reflected paths A5-A7 may operate to increase the extinction ratio of the implementation of FIG. 7 as compared to, for example, the implementation of FIG. 2.

Fixed mirror 712 may be configured and adapted to operate with multiple reflections and/or to operate in a manner similar to fixed mirror 312. Fixed mirror 712 may be capable of accommodating additional incident paths, such as path A5, and may be capable of accommodating additional reflected paths, such as path A6. Moveable mirror 714 may be configured as a flat mirror and/or a curved mirror.

Exemplary MEMS Implementation

Figure 8A:
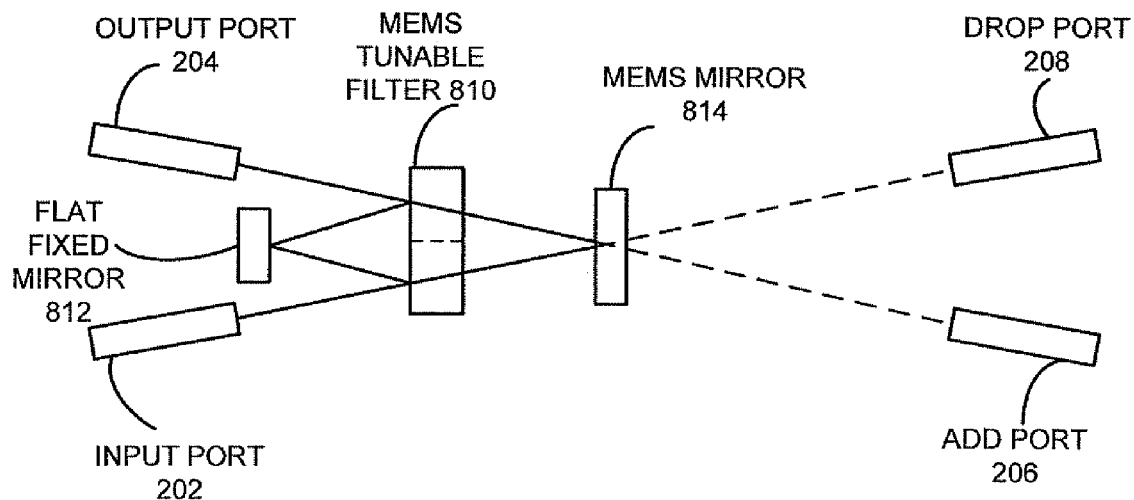
FIGS. 8A and 8B illustrate a side view and top view, respectively, of an exemplary implementation of a hitless tunable filter consistent with the principles of the invention.
Figure 8B:
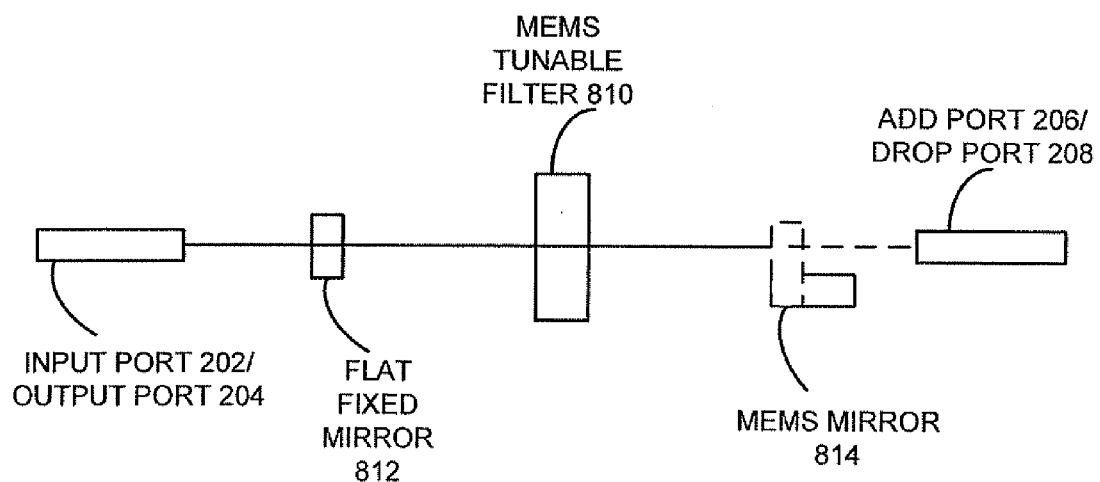

FIGS. 8A and 8B illustrate a side view and top view, respectively, of an exemplary implementation of a hitless tunable filter consistent with the principles of the invention. The implementations of FIGS. 8A and 8B may include input port 202, output port 204, add port 206, drop port 208, micro-electrical mechanical switch (MEMS) tunable filter 810, flat-fixed mirror 812, and MEMS mirror 814. MEMS tunable mirror 810 may include any MEMS device configured and adapted to reflect and/or pass one or more optical wavelengths. MEMS tunable filter 810 may operate to reflect and/or pass wavelengths as a function of the angle of an incident wavelength, as a function of the temperature of the tunable filter, and/or as a function of the thickness of the tunable filter. MEMS tunable filter 810 may be operated by an electrical and/or electro-mechanical source to position MEMS tunable filter 810 in a determined position to filter incoming optical signals. Flat-fixed mirror 812 may include any device configured to reflect an incident optical signal using a substantially flat reflecting surface.

MEMS mirror 814 may include any MEMS compatible device for reflecting and/or passing an incident optical signal to a determined location. MEMS mirror 814 may be moveably operated to displace MEMS mirror 814 from a tuning position, where an incident optical signal is reflected, to a working position, where MEMS mirror 814 does not interact with an incoming optical signal. When MEMS mirror 814 is in a tuning position, an incoming optical signal is reflected to output port 204 after passing through MEMS tunable filter 810. When MEMS mirror 814 is in a working position, an incoming optical signal may pass through MEMS tunable filter 810 en route to drop port 208.

Exemplary Cascade Implementation

FIG. 9 illustrates an exemplary device that employs four hitless tunable filters operating in a cascade arrangement consistent with the principles of the invention. Device 900 may include tunable filter assemblies 902A-902D, an input port 904, an output port 906, add ports 908, and drop ports 910. While four filter assemblies are illustrated in FIG. 9, there may be more or fewer assemblies in other implementations. Tunable assemblies 902A-D may be configured and may operate as previously described in conjunction with FIGS. 2, 3A-C, 4A-D, 5A-B, and 6. Tunable assemblies 902A-D may also be configured and may operate as previously described in conjunction with FIGS. 7, and 8A and 8B.

Tunable assemblies 902A-D may be arranged in a cascade configuration. The cascade configuration may couple an output port from one tunable assembly to an input port associated with a neighboring tunable assembly. For example, an output port of tunable assembly 902A may be operatively coupled to an input port associated with tunable assembly 902B, an output port associated with tunable assembly 902B may be operatively coupled to an input port associated with tunable assembly 902C, and an output port associated with tunable assembly 902C may be operatively coupled to an input port associated with tunable assembly 902D. Device 900 may have one input port 904 and one output port 906 accessible for connections to external signals lines, such as optical fibers.

Device 900 may include an add port and/or a drop port for each tunable assembly 902A-D. For example, the implementation of FIG. 9 may include four add ports 908 and four drop ports 910. Implementations such as device 900 may facilitate the adding and/or dropping of multiple wavelengths using a single integrated device. For example, wavelengths $\lambda 1$-$\lambda 5$ may be coupled to input port 904. Assembly 902A may drop $\lambda 4$, assembly 902B may drop $\lambda 3$, assembly 902C may drop $\lambda 2$, and assembly 902D may drop $\lambda 1$. Output port 906 may make $\lambda 5$ available to other devices, such as other devices on network 102. Implementations such as device 900 may be adapted to operate in ROADMs and/or other network devices.

CONCLUSION

Implementations consistent with the principles of the invention facilitate deployment of truly hitless tunable filters.

The foregoing description of exemplary embodiments of the invention provides illustration and description, but is not intended to be exhaustive or to limit the invention to the precise form disclosed. Modifications and variations are possible in light of the above teachings or may be acquired from practice of the invention.

For example, implementations consistent with the principles of the invention can be implemented using assemblies and parts other than those illustrated in the figures and described in the specification without departing from the spirit of the invention. Parts may be added and/or removed from the implementations of FIGS. 1-9 depending on specific deployments and/or applications. Further, disclosed implementations may not be limited to any specific combination of hardware.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A device for filtering an optical signal, the device comprising:
    a tunable filter having a first arrangement and configured to:
        receive a composite optical signal having:
            a first optical wavelength, and
            a second optical wavelength,
        pass the first optical wavelength, and
        reflect the second optical wavelength;
    a fixed mirror configured to:
        receive the second optical wavelength, and
        reflect the second optical wavelength back to the tunable filter so that the tunable filter can reflect the second optical wavelength to an output port; and
    a moveable mirror configured to:
        reflect the first optical wavelength back to the tunable filter when in a first position, and
        pass the first optical wavelength when in a second position.

2. The device of claim 1, further comprising:
    an input port to make the first and second optical wavelengths available to the tunable filter, where the input port, the tunable filter, the fixed mirror, and the moveable mirror are positioned to make a path length from the input port to the output port taken by the second optical wavelength the same as a path length from the input port to the moveable mirror and from the moveable mirror to the output port taken by the first optical wavelength.

3. The device of claim 1, further comprising:
    a path length correction component configured to:
        alter the optical path length of a signal passing therethrough.

4. The device of claim 3, wherein the path length correction component is at least one of a cylindrical lens, a prism, or glass.

5. The device of claim 1, wherein the fixed mirror has a reflecting surface that is substantially flat or curved.

6. The device of claim 1, wherein the tunable filter is a micro electro-mechanical switch (MEMS) filter, a thin film filter or a thermal filter.

7. The device of claim 1, wherein the moveable mirror is a micro electro-mechanical switch (MEMS) mirror.

8. The device of claim 1, wherein the device is operatively associated with another device in a cascade arrangement.

9. The device of claim 1, wherein the device is operatively associated with a re-configurable optical add/drop multiplexer (ROADM).

10. The device of claim 1, further comprising:
    an optical tap to monitor the first optical wavelength; and
    a monitor port operatively associated with the optical tap.

11. The device of claim 1, wherein the fixed mirror is further configured to:
    enhance an extinction ratio by reflecting the second wavelength back to the tunable filter when the second optical wavelength is received a second time from the tunable filter.

12. The device of claim 1, wherein:
    the second position causes the first optical wavelength to be available to a drop port.

13. A device for filtering an optical signal, the device comprising:
    a filtering component to:
        receive a plurality of wavelengths via a composite optical signal,
        send one of the plurality of wavelengths to an output port via a first path,
        reflect the others of the plurality of wavelengths to the output port via a second path, and
        drop the one of the plurality of wavelengths to a destination via a drop port to filter the one of the plurality of wavelengths from the composite optical signal, where the one of the plurality of wavelengths is dropped without hitting the others of the plurality of wavelengths.

14. The device of claim 13, wherein the one of the plurality of wavelengths is made available to the output port when the device is operating in a first mode and where the one of the plurality of wavelengths is dropped when the device is operating in a second mode.

15. The device of claim 13, further comprising:
    a tunable filter element, wherein an angle of the tunable filter element with respect to the composite optical signal makes the one of the plurality of wavelengths available to the drop port.

16. The device of claim 15, wherein the tunable filter element is a thin film tunable filter element.

17. The device of claim 13, further comprising:
    a moveable mirror to reflect the one of the plurality of wavelengths to the output port.

18. The device of claim 13, further comprising:
    a fixed mirror to reflect the others of the plurality of wavelengths en route to the output port.

19. The device of claim 18, wherein the fixed mirror has a curved reflecting surface.

20. The device of claim 13, wherein a second one of the plurality of wavelengths replaces the one of the plurality of wavelengths on the first path.

21. The device of claim 20, wherein the one of the plurality of wavelengths traverses the second path when the second one of the plurality of wavelengths traverses the first path.

22. The device of claim 13, further comprising:
    a tuning element, wherein the one of the plurality of wavelengths has an angle with respect to the tuning element that causes the one of the plurality of wavelengths to pass through the tuning element.

23. A device for filtering an optical signal, comprising:
a first stage to:
　receive an optical signal comprising a plurality of wavelengths via an input port,
　drop a first one of the plurality of wavelengths via a first tunable filtering element that drops the first one of the plurality of wavelengths without hitting other wavelengths in the optical signal, and
　send the optical signal to a first output port;
a second stage to:
　receive the optical signal from the first output port,
　drop a second one of the plurality of wavelengths via a second tunable filtering element that drops the second of the plurality of wavelengths without hitting other wavelengths in the optical signal, and
　send the optical signal to a second output port; and
a lens to focus the optical signal prior to the optical signal being received by the first stage or the second stage.

24. The device of claim 23, wherein the first stage reflects the optical signal via a first tunable filter element and makes the first one of the plurality of wavelengths available to a moveable mirror, where the moveable mirror reflects the first one of the plurality of wavelengths to the first output port from a first position and allows the one of the plurality of wavelengths to reach the drop port when in a second position.

25. The device of claim 23, wherein the optical signal is made available to the first output port using a fixed mirror.

26. The device of claim 23, wherein the first stage and the second stage are used in a reconfigurable optical add/drop multiplexer (ROADM).

* * * * *